March 31, 1959    D. CHARLES ET AL    2,880,356
LINEAR ACCELERATOR FOR CHARGED PARTICLES
Filed Feb. 23, 1954    3 Sheets-Sheet 1

INVENTORS
Daniel CHARLES
Georges MOURIER
BY
ATTORNEY

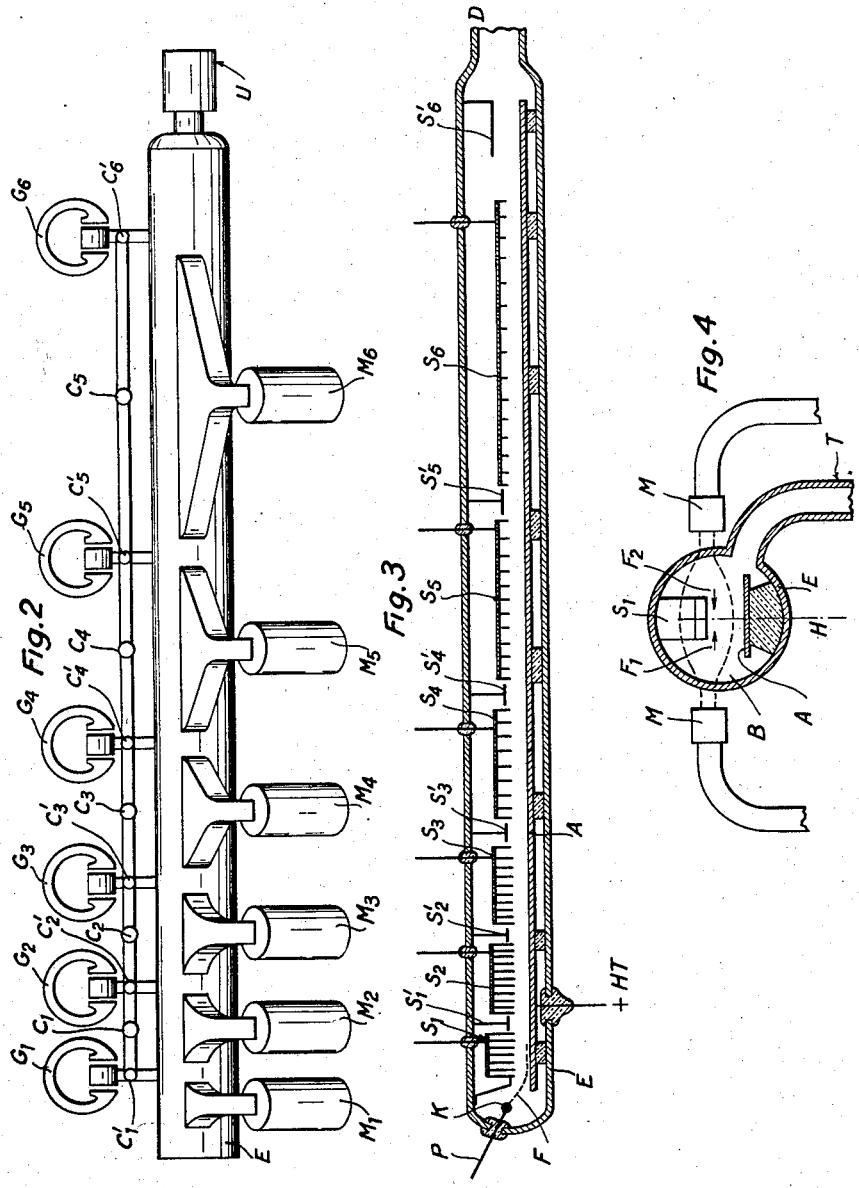

March 31, 1959 D. CHARLES ET AL 2,880,356
LINEAR ACCELERATOR FOR CHARGED PARTICLES
Filed Feb. 23, 1954
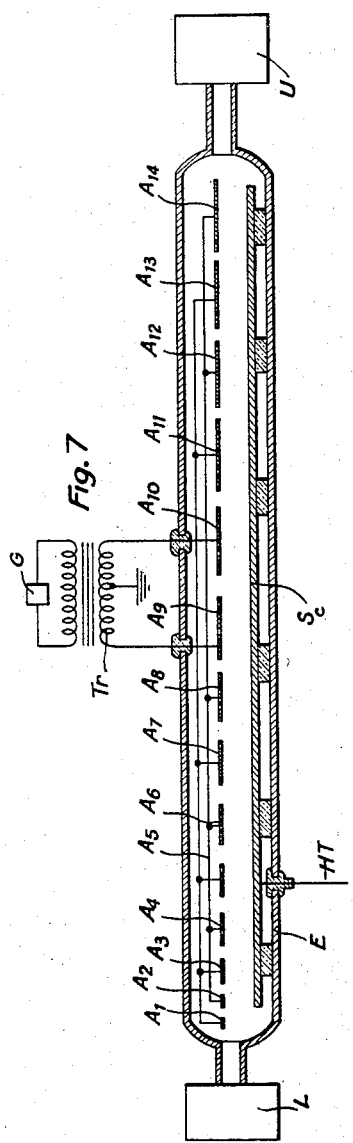
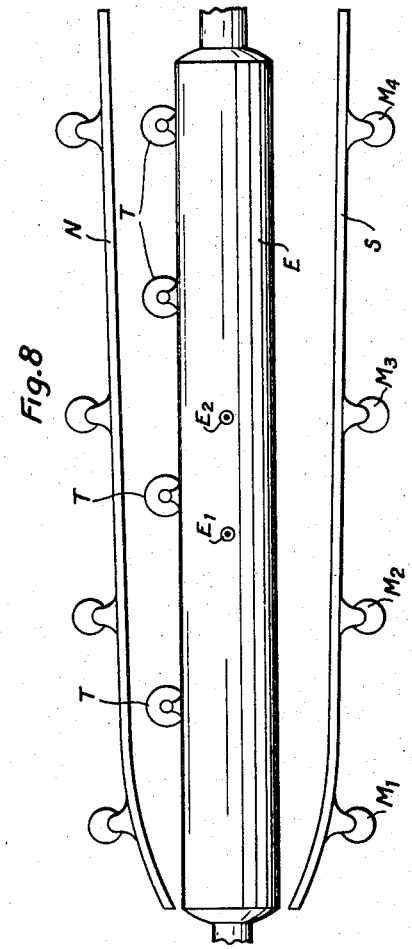
INVENTORS
*Daniel* CHARLES
*Georges* MOURIER
BY
ATTORNEY

United States Patent Office 2,880,356
Patented Mar. 31, 1959

2,880,356

LINEAR ACCELERATOR FOR CHARGED PARTICLES

Daniel Charles and Georges Mourier, Paris, France, assignors to Compagnie Generale de Telegraphie Sans Fil, a corporation of France Application February 23, 1954, Serial No. 411,807

Claims priority, application France February 23, 1953

17 Claims. (Cl. 315—3.6)

The present invention is relative to charged particle accelerators. It is an object of this invention to provide an improved linear accelerator for charged electric particles, such as electrons.

The invention will be described by means of the ensuing description with reference to the accompanying drawings wherein, Fig. 1 is a first diagram illustrating the operation of the accelerator according to the invention;

Fig. 2 is a diagrammatic view of one embodiment of the invention;

Fig. 3 is an axial sectional view of the accelerator shown in Fig. 2;

Fig. 4 is a transverse sectional view of the accelerator shown in Fig. 2;

Figs. 7 and 8 are respectively plan and elevational views of an embodiment of a proton accelerator according to the invention.

Figure 1:
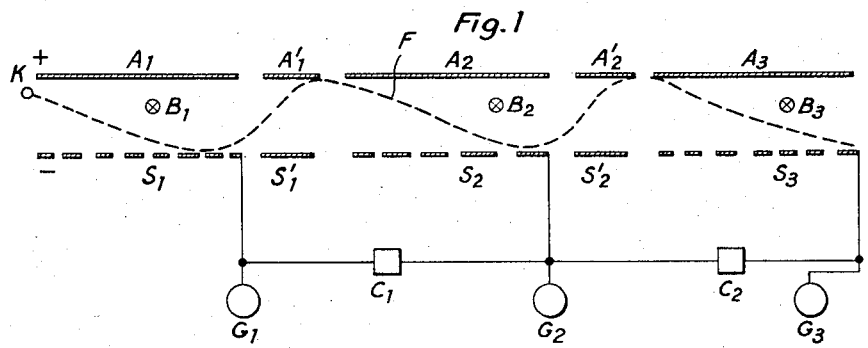

With reference to Fig. 1, K represents a source of electrons situated at the input of a first space $A_1S_1$, defined by two flat and parallel electrodes, $A_1$ and $S_1$. The electrode $A_1$ is at a high potential V relative to the electrode $S_1$. The latter is an ultra-high frequency delay line.

This space is followed by a second space defined by two flat and smooth electrodes $A'_1$ and $S'_1$. The electrode $A'_1$ is at a high potential V relative to electrode $S'_1$. This space is followed by a third space $A_2S_2$ which is defined by two electrodes, one of which $S_2$ is a delay line and the other $A_2$ has a potential V relative to electrode $S_2$. This space is followed by a fourth space $A'_2S'_2$, then by a space $A_3S_3$, which is identical to spaces $A_1S_1$, $A_2S_2$. This succession of spaces may continue up to a space $AnSn$.

$V_p$ is the potential between the delay line $Sp$, $p$th delay line and the electrode $Ap$, $p$th positive electrode. The electrodes $A_1$, $A'_1$ . . . $An$ are parallel to the electrodes $S_1$, $S'_1$, $S_2$ . . . $Sn$. The electrode $Sp$ is facing the electrode $Ap$.

Between the electrodes $A_1$, $S_1$, $A_2$, $S_2$, $An$, $Sn$ are directed uniform magnetic fields $B_1$, $B_2$, $B_3$, . . . $Bn$. The spaces $A'_1S'_1$, $A'_2S'_2$ . . . are not subjected to the action of these magnetic fields.

The delay lines $S_1$, $S_2$, . . . $Sn$ are fed respectively by the ultra short wave generators $G_1$, $G_2$ . . . $Gn$ which feed into these lines a standing wave if these lines have their ends open, or a travelling wave if these ends are provided with a matched load in any known manner. These generators $G_1$, $G_2$, $Gn$ are coupled together by circuits $C_1$ . . . $Cn$ in order to maintain in suitable phase relations the various ultra-high frequency fields thus created, as it will be shown hereinunder.

With reference to Fig. 1, the delay lines $S_1$ . . . $Sn$ are so realised that the ultra-high frequency fields of which they are the seat, have in the direction of propagation of the beam a phase velocity equal to the ratio $$\frac{E_1}{B_1}$$

in the space $A_1S_1$, the ratio $$\frac{E_2}{B_2}$$

in the space $A_2S_2$ . . . and the ratio $$\frac{E_n}{B_n}$$

in the space $AnBn$, $E_1$ . . . . .$En$ being the respective electric fields prevailing in these spaces.

The generators are connected to the right end of each line. It will be assumed by way of example that the phase velocity of the ultra-high frequency field is directed in a direction opposite to that of the propagation of the energy which it carries, it being understood this phase velocity direction is not critical for the invention.

The mechanism of the acceleration is as follows:

When they enter the space $A_1S_1$, the electrons assume a mean velocity $$\frac{E_1}{B_1}$$

which they retain during the whole period they are in the space $A_1S_1$. They retain therefore the same kinetic energy. The wave travelling along the line S has for effect firstly to group the electrons in bunches (i.e. to density modulate the beam) and secondly to gradually urge them towards this line in causing them to pass from high potentials to the lowest potentials. In other words, in retaining their kinetic energy, determined by their mean velocity, they take from the wave the energy necessary for their approaching the electrodes charged at a lower potential. This energy is transformed from the electrons into an increased potential energy.

It will be assumed in the following description that the potentials applied between all the electrode pairs $A_1S_1$ . . . $AnSn$ respectively are the same, and equal to a potential which will be termed V. It will also be assumed that the electrons enter the space $A_1S_1$ at a point K in the vicinity of the anode $A_1$, i.e. on the equipotential of level V. The kinetic energy of each electron in this space $A_1S_1$ is $eV$, where $e$ is the electron charge. Since the electrons are, owing to the action of the ultra-high frequency field near the delay line S, they pass from the equipotential V to the equipotential of the negative electrode, i.e. zero equipotential. Their potential energy is therefore increased by $eV$ in the space $A_1S_1$, their kinetic energy remaining unchanged.

If the electrons, just before attaining the line $S_1$ arrive in the space $A'S'$ without magnetic field, they are attracted by the electrode $A'_1$ which is maintained at the potential V. They fall therefore on this equipotential. In other words their potential energy V is transformed into kinetic energy, $e.V$; at the outlet of the space $A'_1S'_1$ this kinetic energy becomes $2eV$. Their velocity at the outlet of this space $A'_1S'_1$ is therefore, if they have not been captured by the anode $A'_1$, that which they had on entering the space $A_1S_1$ multiplied by $\sqrt{2}$.

They enter therefore, still bunched together, the space $A_2S_2$ at a level in the neighbourhood of the anode A, i.e. on the equipotential V. These electrons retain their new kinetic energy $2eV$ if the magnetic field B is such that the ratio $$\frac{V_0}{B_2} = \frac{V_0}{B_1}\sqrt{2}$$

or $$B_2 = \frac{B_1}{\sqrt{2}}$$

It is clear that for there to be interaction between the beam and the ultra-high frequency travelling along the line $S_2$ it is necessary that the delay ratio of the line $S_2$ be such that the phase velocity of the electromagnetic field, of which it is the seat, be equal to the velocity of the electrons in the space $A_2S_2$. Under these conditions, if, the electrons eneter the space $A_2S_2$ at a moment when the ultra-high frequency field exerts upon them an accelerating action, they are again urged towards the line $S_2$ and increase in the course of their passage through the space $A_2S_2$ their potential energy by $e$V, in the manner above described. For this to occur it is necessary that there be a certain phase relation between the ultra-high frequency field encountered on entering the space $A_1S_1$ by a bunch of electrons and the ultra-high frequency field encountered, upon entering the space $A_2S_2$ by the same bunch. This phase relation depends on the duration of the passage of the electrons in the space $A_1S_1$. The phase shifter $C_1$ which is of known type, enables this phase relation to be realised by trial and error.

Hence, the electrons in the space $A'_2S'_2$ would increase still more their kinetic energy by the amount $eV_0$, and in consequence their velocity, by a corresponding amount.

By repeating the same reasoning it can be seen that, within the electron velocity limits far from the velocity of light, the field B in the space $AnSn$ must be $$\frac{B_0}{\sqrt{n}}$$

and the kinetic energy of the electrons would be $(n+1)eV_0$.

It is obvious that this reasoning is in large part speculative, but it quite clearly takes into account the phenomena involved.

If the velocity of the electrons in the space $AnSn$ is fairly near to the velocity of light, the relation between the successive magnetic fields will be more complicated. However, the fact that the magnetic fields must decrease from one space to the other remains.

Moreover, whatever be these corrections, the reasoning showing that, in each space $A'pS'p$, the electrons have their kinetic energy increased by the amount $eV_0$ remains valid.

Finally, it should be mentioned that the phase velocity of the different fields along the lines $S_1 \ldots Sp \ldots Sn$ increases from one line to the other. On the other hand, since the inertia of the electrons is higher from one space to the other, it is necessary that they travel along a longer path to reach the negative electrode at the end of each space. These spaces $ApSp$ must therefore have lengths which are longer as their rank $p$ is higher.

Fig. 2 shows in perspective an embodiment of the accelerator according to the invention corresponding to the diagram shown in Fig. 1. This accelerator comprises an envelope E and a series of electro-magnets $M_1 \ldots M_6$ which provide the transverse magnetic fields which decrease in succession according to the foregoing explanation. It will be noticed that the polar pieces of successive magnets have increasing lengths in accordance with the increasing lengths of the spaces $A_1S_1 \ldots A_6S_6$.

The generators $G_1 \ldots G_6$ are here magnetrons. The coupling circuits $C_1 \ldots C_6$ are in the form of impedance matching circuits.

Circuits $C'_1 \ldots C'_6$ ensure the matching of the magnetrons corresponding to delay lines $S_1 \ldots S_6$ shown in Fig. 3. At the end of the accelerator there is provided a chamber U in which the accelerated particles are used.

Fig. 3 is a diagrammatic axial sectional view of the accelerator shown in Fig. 2. The sections $S_1$ to $S_6$ are formed by vane type delay lines. The height of these vanes decreases progressively from one line to the other, while the spacing between the vanes increases progressively. The successive sections have increasing lengths. Thus the phase velocities of the waves injected respectively by the generators $G_1 \ldots G_6$ also increase from one section to the other. The electrodes corresponding to $A_1$ to $A_6$ of Figure 1 have been combined into a single positive electrode A. The electron gun K, fed by the connection P, is so disposed that its beam F is injected in the interaction in space, near the electrode A. On the side of the accelerator adjacent to the chamber U, the envelope is closed by a metallic diapragm D which is permeable to the electrons in a known manner.

It will be noticed that, in the embodiment shown, the ultra-high frequency energy is respectively fed to the ends of the sections $S_1 \ldots S_6$ remote from the source K, whereas the ends of the sections in the vicinity of the source are open, which means that the waves fed are standing waves. As already mentioned, there is no objection to using other arrangements; the delay lines may receive the ultra-high frequency at their respective ends adjacent the source and their respective other ends may be provided with matching means, the injected waves being in this case travelling waves.

In order to stabilise the path of the electron beam in the vicinity of the axial plane of symmetry of the tube, it is advantageous to place the interaction space in a magnetic field, in which the lines of force are curved, the curvature of the lines of force near the delay lines being directed towards the latter. This may be very readily obtained by shifting the magnets with respect to the interaction spaces. This arrangement may be seen in Fig. 4, which is a transverse sectional view of the tube shown in Figs. 2 and 3. The line of force B which passes through the interaction space between $S_1$ and A is concave relative to the electrodes $S_1$. It can be shown therefore that the electrons are subjected to a combination of two supplementary forces represented by the arrows $F_1$ and $F_2$. These forces have for effect to bring near the plane of symmetry H the electrons which would have a tendency to leave this plane.

In the same figure there has been shown a pumping tube T by means of which the envelope E can be evacuated.

Figure 5:
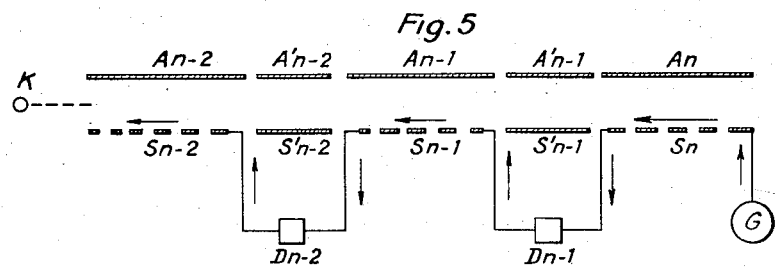
Fig. 5 is a second diagram illustrating the operation of the accelerator according to the invention.

Fig. 5 is a diagrammatic view which shows, in a similar way to Fig. 1, a modification of the invention in which the delay lines $S_1 \ldots Sn$ are interconnected in series with the interposition of phase shifters $D_1 \ldots Dn$ and are fed by a single ultra-high frequency generator G disposed at one end of the tube. The phase shifters serve to correct the phase of the wave at the input of each line $S_1 \ldots Sn$ in such manner, that on their entering each space, the electrons are accelerated by the high frequency fields.

An accelerator, based on this principle, may be realized in the same way as the tubes shown in Figs. 2 and 3. The tube itself is identical to that shown in Fig. 3. Only the exterior accessories of the tube are mounted according to the diagram shown in Fig. 5. The accelerator may also be arranged according to the embodiment shown in Fig. 6. In this figure, like reference numerals designate like elements shown in the preceding figures.

The electron gun K comprises a cathode 1, at zero potential; a Wehnelt 2 at a potential of the order of −1,000 volts; an accelerating anode 3, at a potential VI of the order of 10–100 kv., in the shape of a surface of revolution about the axis of the cathode; two electrodes 4 and 5, in the form of two sections of a cylinder whose generatrices are perpendicular to the plane of the figure. The respective profiles of these cylinders are symmetrical with respect to the plane of symmetry of the tube which is perpendicular to the plane of the figure. The electrodes 4, $A_1 \ldots An$ are brought to the same potential $V_0$ by a source 6. The electrode 5 is brought to the potential $2V_0$.

Such electron gun is in accordance with the gun forming the object of the patent application Serial Number 150,357 of March 18, 1952, filed by the applicant in France on June 19, 1951.

Figure 6:
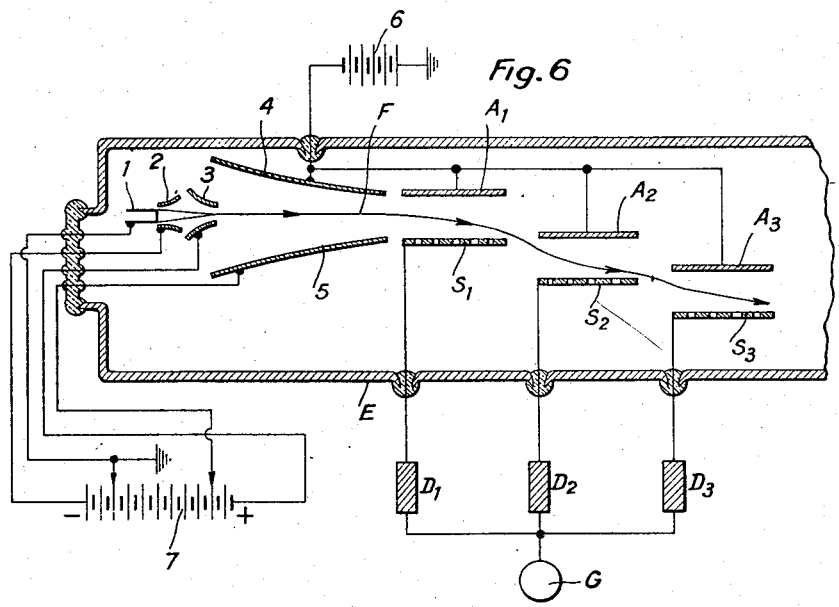
Fig. 6 is a diagrammatic view of a second embodiment of the invention.

The electrodes $S_1 \ldots S_n$ are fed at their left end as seen in Fig. 6 by a single generator G, according to the diagram shown in Fig. 5, through the phase shifters $D_1 \ldots D_n$. These lines are open at their respective right ends. These delay lines are therefore seats of standing waves.

The spaces $A_1,S_1 \ldots A_n, S_n$ are not in axial alignment but are staggered in such manner as to form steps, the space of the rank $p$ being always located higher than the space of the rank $p+1$. In spaces $A_1, S_1 \ldots A_n, S_n$ prevail uniform magnetic fields whose lines of force are perpendicular to the plane of the figure. Their respective values are $B_1 \ldots B_n$.

The electron gun feeds electrons in the entrance of the space $A_1,S_1$ on the equipotential $V_0$ at a velocity equal to $$\frac{V_0}{B_1}$$

Thus, if there were no ultra-high frequency field on the line $S_1$, the electrons would cross this space with uniform velocity and would remain on this equipotential.

The presence of this ultra-high frequency field, whose phase velocity along the axis of the tube is $$\frac{V_0}{B_1}$$

causes electrons to be bunched and curves their path in the direction of the delay line $S_1$. In passing from the equipotential $V_0$ to the equipotential 0, the potential energy of each electron increases by $eV_0$.

At the exit of the space $A_1,S_1$, the electrons encounter a space without magnetic field. They are therefore accelerated by the electrode $A_2$ towards which they are drawn, transforming their potential energy $eV_0$ into kinetic energy. They enter the space $A_2,S_2$ where the mechanism of acceleration is repeated. Their path has the curved shape shown in Fig. 6.

Actually, there is between the spaces $A_1,S_1$ and $A_2,S_2$ a certain magnetic field, for the lines of force of the fields $B_1$ and $B_2$ penetrate in this space. But this field is weak and it favours the acceleration of the electrons between $A_1,S_1$ and $A_2,S_2$. It prevents moreover the electrons from striking the electrode $A_2$. Such an arrangement makes it possible to eliminate the electrodes $A'p$ and $S'p$ shown in Figs. 1, 2 and 3.

Fig. 7 shows an axial sectional view of a proton accelerator according to the invention.

Fig. 8 is an elevational view of the same accelerator.

There is shown in these figures a vacuum filled envelope E. The rectangle L denotes a proton generator of the "Van de Graaf" type. On account of the positive polarity of these particles, the delay lines are here electrodes having positive potentials $A_1 \ldots A_n$. These electrodes face a common negative electrode $S_c$. The protons have a much greater mass than the electrons. Their velocity is therefore much lower for the same accelerating voltages. Hence, it is necessary to use, for the production of the ultra-high frequency fields, eneregy having a frequency which is much lower than in the case of electron accelerators.

The source G is here a source whose frequency corresponds to a metric wave length in free space. This source feeds the primary winding of the transformer $Tr$. The secondary winding of this transformer has its midpoint earthed. One of the terminals of this transformer feeds in parallel the anodes of the even rank, the other terminal feeds in similar fashion the anodes of uneven rank. These anodes are constructed in the form of metallic plates which have the same width and are situated in the same plane. Their length increases progressively, the anode situated near the proton source being shorter than the anodes further away from this source.

Hence, two successive anodes are fed in opposite phase. The anode is the equivalent in metric waves to a vane delay line, having for example vanes whose delay ratio decreases progressively from one end to the other of the tube. The electrode E is brought by a $-H_T$ connection to a negative D.C. high-voltage (100 kvs. for example). The anodes $A_1 \ldots A_n$ have zero biasing potential. The D.C. electric field is therefore constant throughout the tube. The tube is terminated at the right end by a chamber U, as in the above case.

In Fig. 8 it is seen that the envelope E of the tube is placed between two polar pieces N and S. The distance between these pieces increases progressively from the left to the right, that is from the input of the tube to its output. These pieces are fed by electromagnets $M_1$, $M_2$, $M_3$, $M_4$. Four pumping tubes T are provided: $E_1$ and $E_2$ are the connections of the transformer $Tr$.

This tube operates in a manner similar that of the above described tubes. There is, however, one difference between these tubes. The ratio $$\frac{E}{B}$$

does not vary by steps, in increasing from the entrance to the exit of the tube, but in a continuous fashion. The same is true for the delay ratio of the delay line.

What we claim is:

1. An elemental particles accelerator, comprising in an evacuated envelope, at least a pair of electrodes parallel to each other and defining a space therebetween; energized connections to said electrodes for creating an electric field in said space; means for creating through said space a magnetic field having lines of force perpendicular to lines of force of said electric field; means at one end of said envelope for propagating through said space a beam of elemental particles normally to both said fields, said particles having a predetermined polarity, means for collecting said particles at the other end of the envelope, means for feeding U.H.F. energy to the electrode having the same polarity as said particles, delaying elements along the same electrode for delaying U.H.F. energy and for making its phase velocity equal to the velocity of said particles; and means for causing at least one of said fields to change its value at least at spaced points along the path of propagation of said particles lengthwise of said delaying elements for increasing thereby the velocity of said particles.

2. An elemental particles accelerator, comprising in an evacuated envelope, plurality of pairs of elongated electrodes spaced from and parallel to each other and defining spaces therebetween; energized connections to said electrodes for creating electric fields between the electrodes of each pair, means for creating through said spacs a magnetic field having lines of force perpendicular to lines of force of said electric field; means at one end of said envelope for propagating through said spaces a beam of elemental particles normally to both said fields, said particles having a predetermined polarity, means for collecting said particles at the other end of the envelope; means for feeding U.H.F. energy to the electrodes having the same polarity as said particles; delaying elements along the same electrodes for delaying said U.H.F. energy and for making its phase velocity substantially equal to the velocity of said particles; and means for causing at least one of said fields to change its value at least at spaced points along the path of propagation of said particles lengthwise of said delaying elements for increasing thereby the velocity of said particles.

3. An electron accelerator, comprising in an evacuated envelope, a plurality of pairs of elongated electrodes spaced from and parallel to each other and defining spaces therebetween; energized connections to said electrodes for making one electrode of each pair positive and the other negative, thereby creating an electric field between the electrodes of each pair, means for creating through said spaces a magnetic field having lines of force perpendicular to lines of force of said electric field; emitting means at one end of said envelope for propagating through said spaces a beam of electrons normally to both said fields, means for collecting said electrons at the other end of said envelope, means for feeding U.H.F. energy to said negative electrodes, delaying elements along the negative electrodes for delaying said U.H.F. energy and for making its phase velocity substantially equal to the velocity of said electrons; and means for causing at least one of said fields to change its value at least at spaced points along the path of propagation of said electrons lengthwise of said delaying elements for increasing thereby the velocity of said electrons.

4. An elemental particles accelerator, comprising in an evacuated envelope, a first plurality and a second plurality of pairs of elongated electrodes spaced from and parallel to each other and defining spaces therebetween; energized connections to said electrodes for creating an electric field in said spaces, means for creating through said spaces between said electrodes of said first plurality a magnetic field having lines of force perpendicular to lines of force of said electric field; the pairs of said second plurality alternating with the pairs of said first plurality; all the electrodes of the same polarity being in prolongation of each other; emitting means at one end of said envelope for propagating through said spaces a beam of elemental particles normally to both said fields; said particles having a predetermined polarity, means for collecting said particles at the other end of said envelope; means for feeding U.H.F. energy to the electrodes of said first plurality of pairs having the same polarity as said particles; delaying elements along the same electrodes for delaying said U.H.F. energy and for making its phase velocity substantially equal to the velocity of said particles; the delaying elements of each electrode having the same delay ratio, the delay ratios of successive electrodes decreasing progressively from said emitting means to said collecting means; and means for equalizing the ratio of said electric field and said magnetic field with respective phase velocities of U.H.F. energy along said electrodes having delaying elements.

5. An electron accelerator as claimed in claim 3, wherein all the electrodes in prolongation of each other are insulated from each other.

6. An electron accelerator as claimed in claim 3, in which means are provided for decreasing said magnetic field in the direction from said emitting means to said collecting means, said electric field remaining constant.

7. An electron accelerator as claimed in claim 3 in which said electrodes provided with delaying elements have progressively increasing lengths from said emitting means to said collecting means.

8. An electron accelerator as claimed in claim 3, in which each electrode provided with delaying elements is associated with a generator of U.H.F. energy, and further comprising phase shifting means interconnecting said generators.

9. An electron accelerator as claimed in claim 3, wherein said means for feeding U.H.F. energy to said electrodes provided with delaying elements comprise a single generator of U.H.F., connected to the electrode having delaying elements nearest said collecting means, and means for interconnecting said delaying electrodes, said interconnecting means comprising phase shifting means.

10. An accelerator as claimed in claim 1 wherein said means for creating a magnetic field comprise at least a pair of polar pieces facing said space between said pair of electrodes, said polar pieces being shifted nearest to said electrode provided with delaying elements.

11. An elemental particles accelerator comprising in an evacuated envelope, a plurality of pairs of electrodes spaced from and parallel to each other and defining spaces therebetween; energized connections to said electrodes for creating electric fields between the opposite electrodes of each pair; means for creating through said spaces a magnetic field having lines of force pependicular to lines of force of said electric field; emitting means at one end of said envelope for propagating through said spaces a beam of elemental particles normally to both said fields; said particles having a predetermined polarity, means for collecting said particles at the other end of said envelope, said pairs of electrodes being staggered, each pair of electrodes being transversely shifted from the preceding pair, in a direction perpendicular to the direction of said beam; means for feeding U.H.F. energy to the electrodes having the same polarity as said particles; delaying elements along the same electrodes for delaying said U.H.F. energy and for making its phase velocity substantially equal to the velocity of said particles; the delaying elements of each electrode having the same delay ratio, the delay ratio of successive electrodes decreasing progressively from said emitting means to said collecting means; and means for equalizing the ratios of said electric field and said magnetic field with respective phase velocities of U.H.F. energy along said electrodes having delaying elements.

12. An elemental particle accelerator comprising in an evacuated envelope having a first end and a second end, two elongated parallel substantially plane electrodes opposite thereof and defining a space therebetween; energized connections to said electrodes for creating an electric field having lines of force perpendicular to said electrodes, means for creating through said space a magnetic field having lines of force perpendicular to lines of force of said electric field, means for continuously decreasing the strength of said magnetic field from said first end of said envelope to said second end; means near said first end of said envelope for propagating through said space a beam of elemental particles normally to both said fields, said particles having a predetermined polarity, and means for collecting said particles at said second end; means for feeding U.H.F. energy to the electrode having the same polarity as said particles, and delaying elements along the same electrode for delaying U.H.F. energy, said delaying elements having delay ratios decreasing progressively from said first end to said second end, for making the phase velocity of said U.H.F. energy along said electrode substantially equal to the ratio of said electric and said magnetic field.

13. An accelerator according to claim 12 in which said particles are protons, said electrode with delaying elements being constituted by a series of plate; further comprising a transformer having a primary and a secondary winding, a source of radio-frequency energy in the V.H.F. band, said source being connected to said primary winding, said secondary winding having a first and a second terminal, said first terminal being connected to a first plurality of plates, said second terminal being connected to a second plurality of plates, the plates of said first plurality alternating wtih the plates of said second plurality, the respective length of said plates increasing progressively from said first end to said second end.

14. An accelerator according to claim 13, in which said magnetic field producing means are constituted by a pair of pole pieces, the distance between them increasing progressively from said first end to said second end.

15. Apparatus for accelerating elemental particles carrying electrical charges of one polarity comprising in an elongated evacuated envelope a delay line having a plurality of delay line portions, a sequence of spaced, flat electrodes each of which is facing a wave delay line portion of same length and parallel thereto thus defining a sequence of particle and wave interaction spaces mutually separated by short intellmediate spaces; means for producing crossed electrostatic and magnetic fields in said interaction spaces, said means including means for raising said delay line portions to a potential of said one polarity with respect to said flat electrodes; means for injecting into the first of said interaction spaces a beam of said particles propagating across said sequence; means for feeding an ultra-high-frequency electromagnetic wave to said delay line portions to produce interaction between said beam and a spatial harmonic component of said wave so that energy is yielded from said wave to said beam, whereby said particles are accelerated, the velocity thereof increasing from one interaction space to another, said delay line portions being constructed to have delay characteristics which vary from one to another in such a way that the phase velocity of said wave component increases in said sequence, while the electrostatic to magnetic strength ratio in each interaction space is adjusted to be equal to said phase velocity.

16. Apparatus as claimed in claim 15, further comprising means in said intemediate spaces for urging said particles from each interaction space of said sequence to the following one, said means including two flat parallel electrodes and means for establishing therebetween an electrostatic field similar to that prevailing in said interaction spaces.

17. Apparatus as claimed in claim 15, wherein said interaction spaces are shifted stepwise with respect to one another, whereby particles are urged from nearby the delay line portion of one interaction space towards the flat electrode of the following interaction space.

References Cited in the file of this patent

UNITED STATES PATENTS

| | | |
|---|---|---|
| 2,233,779 | Fritz | Mar. 4, 1941 |
| 2,414,121 | Pierce | Jan. 14, 1947 |
| 2,464,349 | Samuel | Mar. 15, 1949 |
| 2,536,150 | Backmark et al. | Jan. 2, 1951 |
| 2,543,082 | Webster | Feb. 27, 1951 |
| 2,582,186 | Willshaw | Jan. 8, 1952 |
| 2,651,001 | Brown | Sept. 1, 1953 |
| 2,653,271 | Woodyard | Sept. 22, 1953 |
| 2,680,823 | Dohler et al. | June 8, 1954 |
| 2,687,777 | Warnecke et al. | Aug. 31, 1954 |
| 2,730,648 | Lerbs | Jan. 10, 1956 |
| 2,760,103 | Salisbury | Aug. 21, 1956 |